United States Patent
Sun et al.

(10) Patent No.: US 10,389,490 B2
(45) Date of Patent: Aug. 20, 2019

(54) SYSTEM AND METHOD FOR MEDIA ACCESS CONTROL TRANSPORT BLOCKS

(71) Applicant: Futurewei Technologies, Inc., Plano, TX (US)

(72) Inventors: Yishen Sun, Buffalo Grove, IL (US); Hao Bi, Lake Zurich, IL (US)

(73) Assignee: Futurewei Technologies, Inc., Plano, TX (US)

( * ) Notice: Subject to any disclaimer, the term of this patent is extended or adjusted under 35 U.S.C. 154(b) by 401 days.

(21) Appl. No.: 14/512,133

(22) Filed: Oct. 10, 2014

(65) Prior Publication Data

US 2015/0103725 A1 Apr. 16, 2015

Related U.S. Application Data

(60) Provisional application No. 61/889,347, filed on Oct. 10, 2013.

(51) Int. Cl.
| | |
|---|---|
| *H04L 29/12* | (2006.01) |
| *H04L 1/18* | (2006.01) |
| *H04W 4/08* | (2009.01) |
| *H04L 1/00* | (2006.01) |

(52) U.S. Cl.
CPC .......... *H04L 1/1861* (2013.01); *H04L 1/1812* (2013.01); *H04L 1/1858* (2013.01); *H04W 4/08* (2013.01); *H04L 2001/0093* (2013.01)

(58) Field of Classification Search
None
See application file for complete search history.

(56) References Cited

U.S. PATENT DOCUMENTS

| | | |
|---|---|---|
| 2009/0156194 A1 | 6/2009 | Meylan |
| 2011/0019604 A1 | 1/2011 | Chun et al. |
| 2012/0057530 A1 | 3/2012 | Marinier et al. |
| 2013/0301582 A1 | 11/2013 | Jiang et al. |

FOREIGN PATENT DOCUMENTS

| | | |
|---|---|---|
| CN | 101931882 A | 12/2010 |
| CN | 102595600 A | 7/2012 |
| CN | 102595624 A | 7/2012 |
| EP | 2658338 B1 | 10/2015 |
| WO | 2012097692 A1 | 7/2012 |

OTHER PUBLICATIONS

"LTE; Evolved Universal Terrestrial Radio Access (E-UTRA) and Evolved Universal Terrestrial Radio Access Network (E-UTRAN); Overall description; Stage 2," European Telecommunications Standards Institute (ETSI), 3GPP TS 36.300, Version 11.6.0, Release 11, Jul. 2013, 223 pgs.
International Search Report and Written Opinion of Patent Cooperation Treaty (PCT), International Application No. PCT/US14/60149, Applicant: Huawei Technologies Co., LTD, dated Jan. 15, 2015, 9 pages.

*Primary Examiner* — Willie J Daniel, Jr.
(74) *Attorney, Agent, or Firm* — Slater Matsil, LLP

(57) ABSTRACT

In one embodiment, a method for transmitting a first media access control (MAC) protocol data unit (PDU) includes determining a plurality of user equipments (UEs) in a group of UEs and determining that a first MAC PDU is destined for multiple UEs in the group of UEs. The method also includes setting the first MAC PDU to indicate that the first MAC PDU is destined for multiple UEs in the group of UEs and transmitting, by a communications controller to the plurality of UEs, the first MAC PDU.

28 Claims, 7 Drawing Sheets

US 10,389,490 B2

SYSTEM AND METHOD FOR MEDIA ACCESS CONTROL TRANSPORT BLOCKS

This application claims the benefit of U.S. Provisional Application Ser. No. 61/889,347 filed on Oct. 10, 2013, and entitled "System and Method for Media Access Control Transport Block Sharing Among Multiple User Equipments," which application is hereby incorporated herein by reference.

TECHNICAL FIELD

The present invention relates to a system and method for wireless communications, and, in particular, to a system and method for media access control transport blocks.

BACKGROUND

In Long Term Evolution (LTE) systems, when unicast service is used, downlink (DL) media access control (MAC) transport blocks (TBs) are user equipment (UE) specific. That is, the data of a MAC TB is destined for only one UE. The physical (PHY) layer overhead associated with transferring a UE specific MAC TB includes, but is not limited to, a physical downlink shared channel (PDSCH) and a physical downlink control channel (PDCCH) signaling/configuration, such as cell radio network temporary identities (C-RNTI), downlink control information (DCI) format, etc.

Complementary to the traditional unicast service, multimedia broadcast multicast service (MBMS) supports multicast and broadcast services in cellular systems. With MBMS, the same content is transmitted to multiple users located in a specific area, an MBMS service area, which may include multiple cells.

SUMMARY

An embodiment method for transmitting a first media access control (MAC) protocol data unit (PDU) includes determining a plurality of user equipments (UEs) in a group of UEs and determining that a first MAC PDU is destined for multiple UEs in the group of UEs. The method also includes setting the first MAC PDU to indicate that the first MAC PDU is destined for multiple UEs in the group of UEs and transmitting, by a communications controller to the plurality of UEs, the first MAC PDU.

An embodiment method for receiving a media access control (MAC) protocol data unit (PDU) includes receiving, by a user equipment (UE) from a communications controller, the MAC PDU and transmitting, by the UE to the communications controller, a hybrid automatic repeat request (HARQ) response in accordance with the MAC PDU. The method also includes parsing the MAC PDU to produce a parsed MAC PDU and transmitting, by the UE to the communications controller, a radio link control (RLC) message in accordance with the parsed MAC PDU.

An embodiment communications controller includes a processor and a non-transitory computer readable storage medium storing programming for execution by the processor. The programming including instructions to determine a plurality of user equipments (UEs) in a group of UEs and determine that a first MAC PDU is destined for multiple UEs in the group of UEs. The programming also includes instructions to set the first MAC PDU to indicate that the first MAC PDU is destined for multiple UEs in the group of UEs and transmit, to the plurality of UEs, the first MAC PDU.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Multimedia broadcast multicast service (MBMS) supports multicast services in a cellular system. The same content is transmitted to multiple users located in an MBMS area, which may contain multiple cells. In the participating cells, a point-to-multipoint radio resource is configured, and users subscribing to the MBMS service simultaneously receive the same transmitted signal. The users' movements in the radio-access network are not tracked, and users may receive the content without notifying the network. When MBMS is in use, the same media access control (MAC) transport block (TB) is received over the multicast traffic channel (MTCH) by all UEs subscribed to the service.

In MBMS, the radio resources used for MBMS are multicast broadcast single frequency network (MBSFN) subframes. Also, at the radio link control (RLC) layer, the data which is multicasted through MBMS is transferred in RLC un-acknowledgement mode (UM). At the MAC layer, the hybrid automatic repeat request (HARQ) transmission of the multicasted data in MBMS occurs only once in the downlink direction. That is, HARQ Acknowledgement (ACK)/Negative acknowledgement (NACK) is provided by the receiving user, and there is no HARQ retransmission of the MAC TB. Additionally, the data is multicasted in a relatively predetermined pattern.

Figure 1:
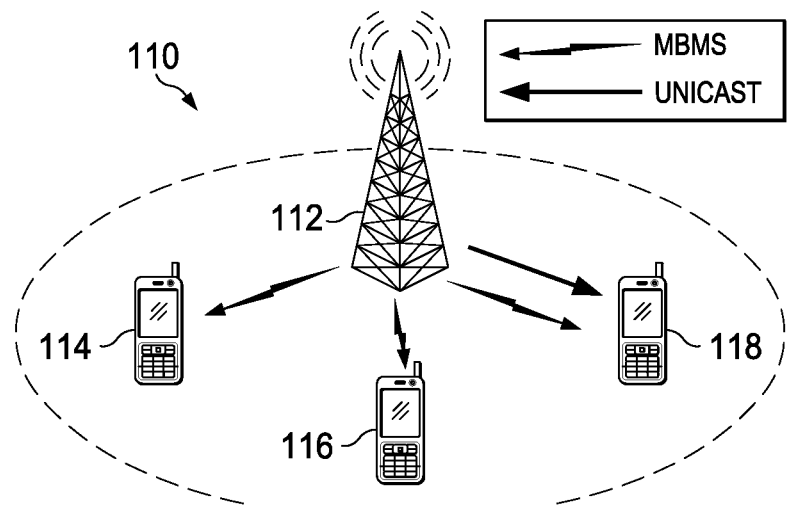
FIG. 1 illustrates an embodiment network.

FIG. 1 illustrates network 110. Communications controller 112 communicates with UEs 114, 116, and 118. Three UEs are depicted, but many more may be present. Communications controller 112 may be any component capable of providing wireless access by, inter alia, establishing uplink and/or downlink connections with UEs 114, 116, and 118, such as a base station, an enhanced base station (eNB), an access point, a picocell, a femtocell, and other wirelessly enabled devices. UEs 114, 116, and 118 may be any component capable of establishing a wireless connection with communications controller 112, such as cell phones, smart phones, tablets, sensors, etc. The backhaul network may be any component or collection of components that allow data to be exchanged between communications controller 112 and a remote end. In some embodiments, the network 110 may include various other wireless devices, such as relays, femtocells, etc. There may be unicast service between communications controller 112 and UE 118. In unicast service, there is a UE specific media access control (MAC) transfer block (TB) over a physical downlink shared channel (PDSCH). There is overhead associated with transferring a UE specific MAC TB.

MBMS service may be between communications controller 112 and UEs 114, 116, and 118. In MBMS, there is one MAC TB for the UEs, transferred over physical multicast channel (PMCH). However, multicast broadcast single frequency network (MBSFN) resources for all UEs are limited. Also, there is a semi-static pattern or configurations for MBMS. Additionally, the RLC is UM only, without acknowledgement mode (AM).

In a group call, the communications controller transmits the same files or packets to multiple UEs in the same cell from time to time. The availability and length of these files may be random, and the intended receiving UEs may vary. For example, during a conference call, the real time screen display is shared over the web among participants. Some participants may be located in the same cell, e.g., within the same floor or wing of an office building. The update of the display is distributed to participants in time. For example, during a conference call, the real-time screen display is shared among participants. The timing of the content of the update, however, is hard to predict. Also, not all of the UEs within the cell(s) are participating in the group call. In MBMS for group calls, because the availability and length of the files to be multicasted may be random, it is problematic to configure radio resources for multicast use in advance. Also, it is desirable for both RLC AM mode and UM mode to be supported, depending on the content of the data. For the audio session of the group call UM may be used. However, for screen display and/or shared documents, AM may be used for comprehensiveness. Additionally, some participants may join later and want to catch up with previous content.

In instant messaging (IM) applications, the communications controller transmits small packets to a UE from time to time, and the timing of those packets is not periodic. There may be multiple such UEs within a cell. For example, when a UE is running IM applications, the network delivers small packets to the UE aperiodically. It is possible that multiple UEs in the same cell are using the IM service simultaneously, such as in a subway coach, or an office building area where colleagues are communicating with each other. Because the data is UE specific and the timing of the data's availability is unpredictable, it is a waste of the UE processing power and MBSFN radio resources to broadcast/multicast the data to every UE.

Network 110 may be used in a hybrid multicast-unicast system with sharing MAC TBs among several configured UEs in a group. This may provide a flexible efficient service. Multiple UEs receive the same MAC TB on the same PDSCH. Then, the UEs parse the MAC TB and decide whether there are MAC service data units (SDUs) for it.

Figure 2:
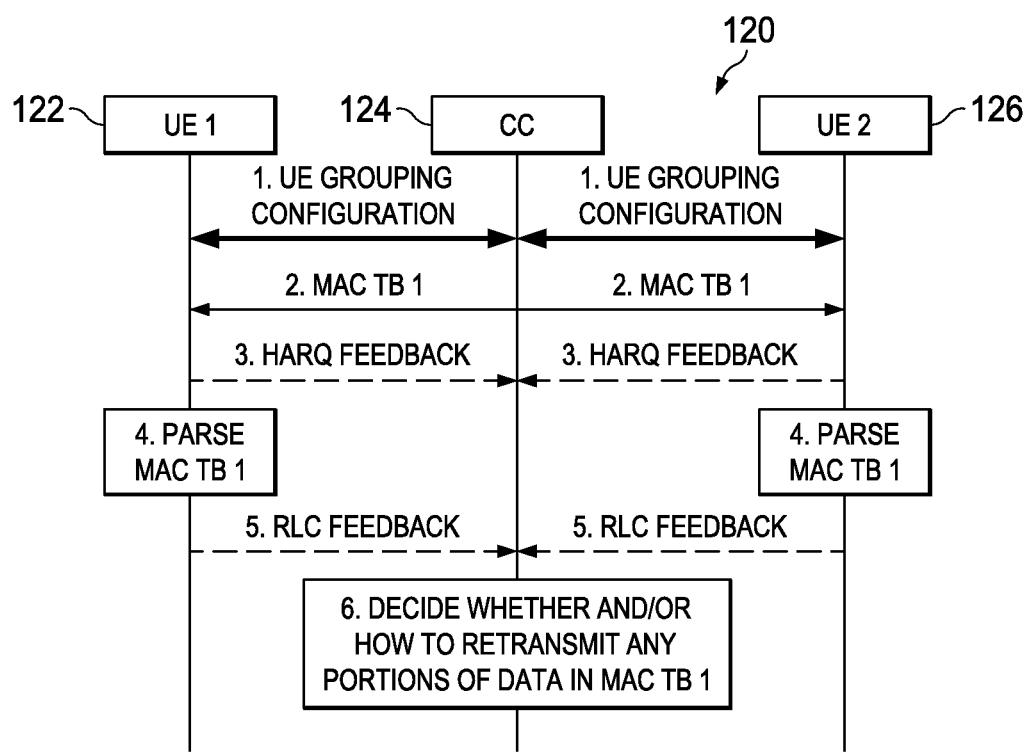
FIG. 2 illustrates a flow diagram for an embodiment method of media access control (MAC) transport blocks (TBs)

FIG. 2 illustrates message diagram 120 for MAC TB sharing among multiple UEs using the same PDSCH. UEs in a group listen to a physical downlink control channel (PDCCH) which may perform reception on the same PDSCH resources in time and frequency. Communications controller (CC) 124 communicates with UE 122 and UE 126. In one example, there is one group, with UE 122 and UE 126 as the members. One communications controller may have more than one group, and a group may contain more than two UEs. Initially, communications controller 124 performs UE grouping configuration with UEs 122 and 126. UEs may be added, activated, deactivated, and removed.

UEs who are instructed to perform reception on the same PDSCH resources are in the same group. A group-specific RNTI (G-RNTI) may be assigned. The G-RNTI is applicable to a subset of UEs in the cell who are members of the same group. The communications controller may send RRC configuration messages or MAC channel elements (CEs) to inform a UE of a grouping configuration, for example to instruct the UE to activate or deactivate listening to PDCCH for a specific downlink control information (DCI) information. Configuration messages may include a G-RNTI, C-RNTI, and/or UE identification numbers (UE IDs). A UE ID may be a group specific value or a universal value. Also, a UE's C-RNTI may be used as a default UE ID.

RRC messages or MAC CEs may be used to perform UE grouping configurations. In one embodiment, adding and removing are performed using RRC messages, while activation and deactivation are performed using MAC CEs. Activation of a UE causes the UE to start to listen to the PDCCH for the DCI of group communication, which points to the reception of MAC TBs from the specific PDSCH resources, while deactivation stops the UE from listening to the PDCCH for the DCI of group communication, which points to the reception of MAC TBs from the specific PDSCH resources. In some examples, activation may occur immediately upon adding a UE in the group communication in a configuration message and deactivation may occur immediately before removing a UE from the group communication in a configuration or reconfiguration message. However, activation and deactivation may be performed separately from adding and removing, because of the dynamics of network traffic and scheduling decisions. For example, when a UE starts an IM session, it may be the only UE in that cell which receives small packets from time to time. The network sends the grouping information to a UE in advance without requesting that the UE start receiving data for the G-RNTI yet. Once there are sufficient UEs in the cell transferring small packets frequently, the communications controller schedules the MAC TB sharing service and activates the UE to listen to the PDCCH for the specific DCI with the G-RNTI.

After UEs have been activated, communications controller 124 transmits the same MAC TB to multiple UEs, UE 122 and UE 126, over the shared PDSCH using the same time frequency resources. This may be indicated, for example, by the G-RNTI.

In response to the reception of a PDSCH carrying MAC TB, UEs 122 and 126 provide HARQ feedback (ACK/NACK) to communications controller 124 in accordance with the configuration. A UE within the group may be configured to skip HARQ feedback as in MBMS. In another example, a UE within the group is configured to send HARQ ACK/NACK when there is data transferred in shared MAC TBs over a PDSCH. In another configuration, HARQ feedback is provided when there is data for the UE in the shared MAC TB. Alternatively, the UE always provides HARQ feedback. In one example, downlink is shared, as UEs perform the reception on the same time and frequency PDSCH resources for the shared MAC TBs, while uplink is dedicated, as UEs transmit ACK/NACK feedback on their specific uplink (UL) resources. Alternatively, downlink and uplink are both shared, where UEs share UL resources in time and frequencies for the transmission of ACK/NACK.

UE 122 and UE 126 parse the shared MAC TB to decide whether there is any data for the receiving UE. The MAC format may indicate whether a MAC TB is shared by multiple UEs. In one example, when a MAC TB is received from the shared PDSCH, for example pointed to by the DCI with G-RNTI, it is automatically considered to be the MAC TB shared by multiple UEs. In another example, a MAC CE indicates whether the MAC TB is shared by multiple UEs. A MAC logical channel ID (LCID) may be reserved for the new MAC CE.

In another embodiment, it is assumed that all activated UEs within a group by default need to process MAC SDUs of the MAC protocol data unit (PDU) for the specified G-RNTI. Only the MAC SDUs which are destined for a subset of the activated UEs of the group are indicated. A new MAC sub-header may be used to indicate that the MAC SDU is intended for a subset of activated UEs of a group.

Also, the MAC format indicates the correspondence between a MAC SDU and a UE. In one example, a C-RNTI or UE ID of the UE corresponding to the MAC SDU is included in the front of the sub-header of the MAC SDU. Alternatively, the C-RNTI or UE ID of the corresponding UE is added to the beginning of the MAC SDU payload.

Additionally, the MAC format indicates the correspondence between a MAC SDU and multiple UEs. In group calls, when an update of a screen display occurs, multiple UEs may receive the same MAC SDU when the content is ciphered using a key known to the involved UEs. Thus, multiple UE IDs or C-RNTIs may be added to the sub-header of the MAC SDU to indicate recipients of the MAC SDU. In one example, the number of intended UEs is added using the LENGTH field, and a list of C-RNTIs or UE IDs of the corresponding UEs is added to the MAC sub-header of the MAC SDU. Receiving UEs may have been assigned the same LCID for the shared data. In another example, each UE has a different LCID for the shared data. In another example, the list of C-RNTIs or UE IDs of the corresponding UEs is added to the beginning of the MAC SDU payload. Alternatively, a bitmap is added to the MAC sub-header of the MAC SDU, indicating the intending receiving UEs, by having the bits in the bitmap set to the value 0 or 1 according to whether or not the associated UE is to receive the MAC SDU. The mapping between the bitmap value and the UEs in the group may be configured by the network in advance, for example through RRC messages, when UE is configured into the group call.

After parsing the MAC TB, the UEs provide RLC feedback (ACK/NACK) to the communications controller. A UE within the group may be configured to skip RLC feedback when in UM mode. In another example, a UE within the group is configured to send RLC STATUS PDUs when the downlink data is transferred in AM mode. The uplink radio resource for RLC feedback may be configured independently of the downlink resource. For example, the uplink transmission MAC TB is UE specific, while the downlink transmission is through the shared MAC TB. A UE may be configured to provide RLC feedback upon a trigger. For example, a UE may send RLC feedback periodically without explicit polling by a communications controller. In another example, the communications controller polls the UEs for RLC feedback.

Communications controller 124 decides whether to retransmit some or all of the MAC TB, for example based on the HARQ feedback and/or the RLC STATUS PDU received from the UEs. For a MAC TB destined for multiple UEs, when the network receives HARQ feedback and/or RLC STATUS PDU from multiple UEs, the decision of retransmission may have several options. The communications controller decides whether to retransmit any data. When retransmission is decided upon, the communications controller may decide whether to retransmit the whole MAC TB or construct a new MAC TB, for example only with data for UEs transmitting HARQ NACKS or RLC STATUS PDU NACKS. When retransmission is to be performed, the communications controller may decide whether to transmit it on a shared MAC TB or one or more dedicated MAC TB(s). When retransmission is to be performed, the communications controller may decide whether to send the data to all UEs of the group or a subset of the group. For example, the communications controller may decide to retransmit the MAC TB over the same shared PDSCH when one UE NACKs the last transmission or retransmission and the maximum retransmit attempts have not been reached.

The MAC format may indicate whether a MAC TB is shared by multiple UEs. In one example, when a MAC TB is received from the shared PDSCH, for example through a G-RNTI, it is assumed to be the MAC TB shared by multiple UEs.

Figure 3:
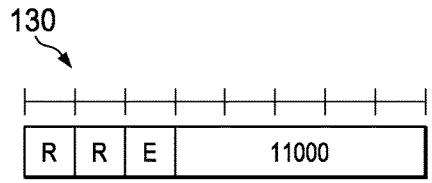
FIG. 3 illustrates an embodiment MAC sub-header for TB sharing.

In another example, a MAC CE is defined which indicates that the MAC TB is shared by multiple UEs. FIG. 3 illustrates sub-header 130, a TB sharing CE sub-header with reserved (R) bits, an extension (E) bit, and an LCID. The MAC LCID, for example LCID=11,000, is reserved for the new MAC CE.

In an additional embodiment, the default is that all activated UEs within a group process the MAC SDUs of the MAC PDU for the specified G-RNTI. The MAC SDUs destined for a subset of the activated UEs of the group are indicated. A MAC sub-header may be used to indicate that the MAC SDU is intended for a subset of the activated UEs of the group.

Figure 4A:
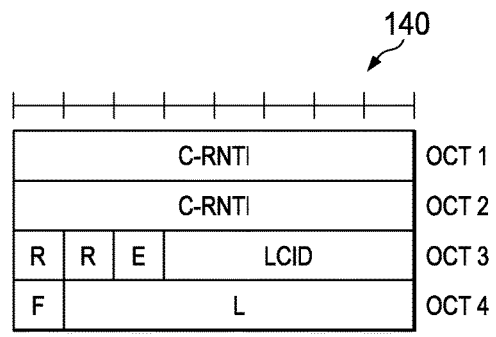
FIGS. 4A-4B illustrate embodiment MAC service data unit (SDU) sub-headers with cell radio network temporary identities (C-RNTIs)
Figure 4B:
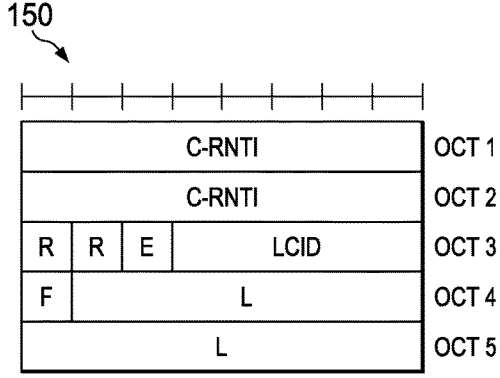

Also, the MAC format may indicate the correspondence between a MAC SDU and a UE. In one example, a C-RNTI of the corresponding UE is in the header of the MAC SDU, for example in the front of the sub-header. FIGS. 4A-B illustrate example MAC SDU sub-headers which indicate C-RNTIs of UEs. FIG. 4A shows MAC SDU sub-header 140, a reserved (R)/R/E/LCID/format (F)/length (L) sub-header with a seven bit L field. Also, FIG. 4B illustrates MAC SDU sub-header 150, an R/R/E/LCID/F/L sub-header with 15 bits in the L field. Alternatively, the C-RNTI of the corresponding UE is at the beginning of the MAC SDU payload. In this example, the UEs parse the MAC SDU payload to extract UE C-RNTI information.

Figure 5A:
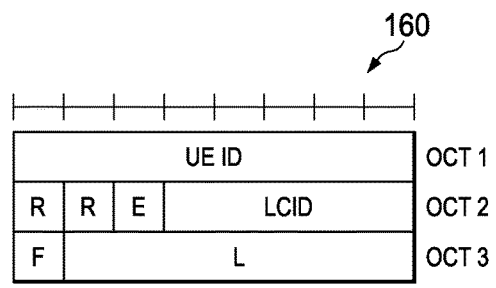
FIGS. 5A-5B illustrate embodiment MAC SDU sub-header with user equipment identification numbers (UE IDs)
Figure 5B:
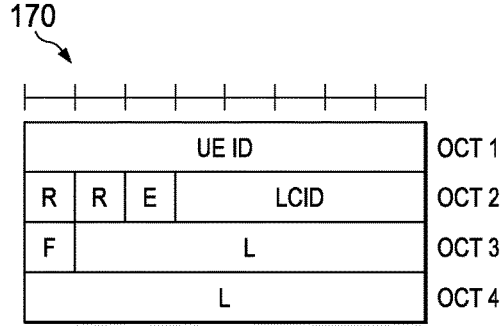

In another embodiment, the UE ID of the corresponding UE is in the sub-header of the MAC SDU, for example in the front of the sub-header. FIGS. 5A-B illustrate an example of MAC SDU sub-headers which indicate the UE IDs of UEs in the group. The UE ID may be one byte long. FIG. 5A shows MAC SDU sub-header 160, an R/R/E/LCID/F/L sub-header with seven bits in the L field, and FIG. 5B shows MAC SDU sub-header 170, an R/R/E/LCID/F/L sub-header with 15 bits in the L sub-header. In an additional embodiment, the UE ID of the corresponding UE is at the beginning of the MAC SDU payload. In this example, the UEs parse the MAC SDU payload to extract the UE ID information.

The MAC formant may indicate the correspondence between a MAC SDU and multiple UEs. This may be useful for group calls. When an update of a screen display occurs, multiple UEs may receive the same MAC SDU while the content is ciphered using a key known to the UEs involved. Thus, multiple UE IDs or C-RNTIs may be added to the sub-header of the MAC SDU to indicate recipients of the MAC SDU.

Figure 6A:
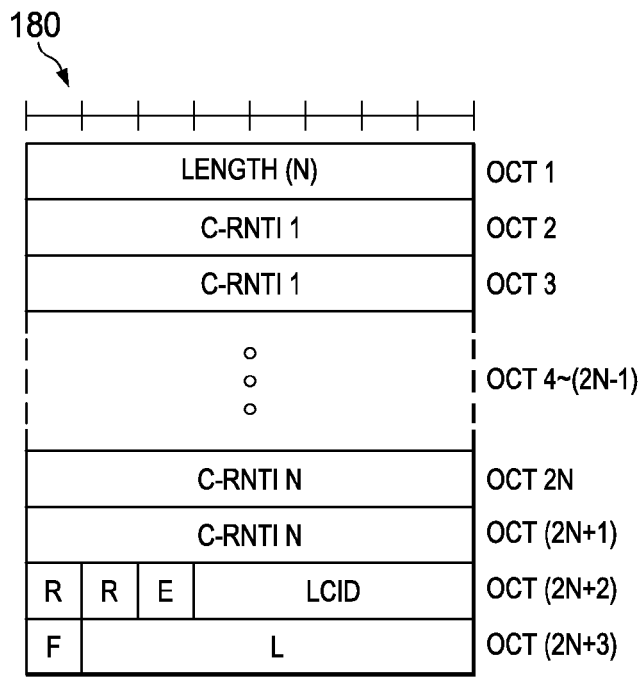
FIGS. 6A-6B illustrate embodiment MAC SDU sub-headers with the number of UEs in a group and a list of C-RNTIs of UEs in the group.
Figure 6B:
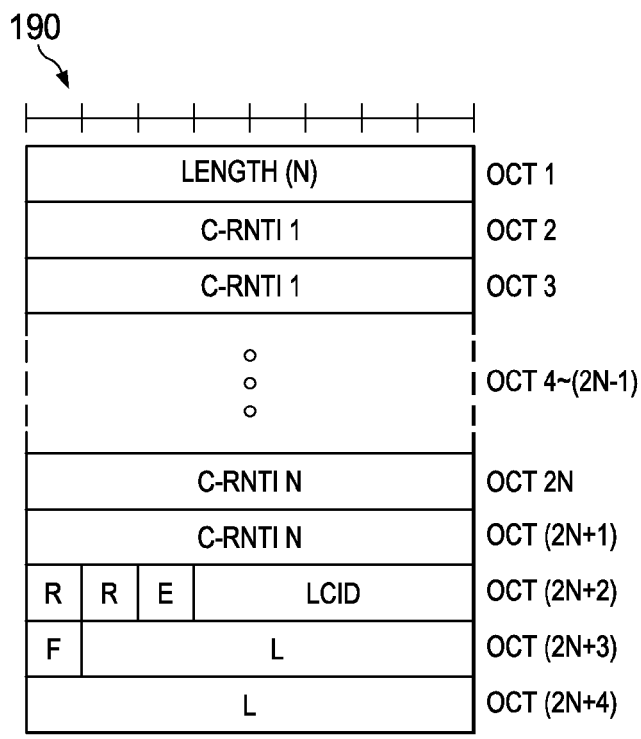

In one example, the number of intended receiving UEs is added to the MAC sub-header of the MAC SDU, and a list of C-RNTIs of the corresponding UE are added to the MAC sub-header, for example at the front of the sub-header. FIGS. 6A-B illustrate examples of MAC SDU sub-headers with lists of C-RNTIs of UEs in a group. FIG. 6A shows MAC SDU sub-header 180, an R/R/E/LCID/F/L sub-header with seven bit L fields, while FIG. 6B shows MAC SDU sub-header 190, an R/R/E/LCID/F/L sub-header with 15 bit L fields. The receiving UEs may have been assigned the same LCID for the shared data. In this example, the format illustrated by FIGS. 6A-B may be used. In another example, the UEs each had different LCIDs for the shared data. In this example, the MAC SDU sub-header may list both C-RNTIs and LCIDs of the UEs.

In an additional example, the C-RNTI of the UE is added to the beginning of the MAC SDU payload. The UEs may parse the MAC SDU payload to extract the UE C-RNTI information.

Figure 7A:
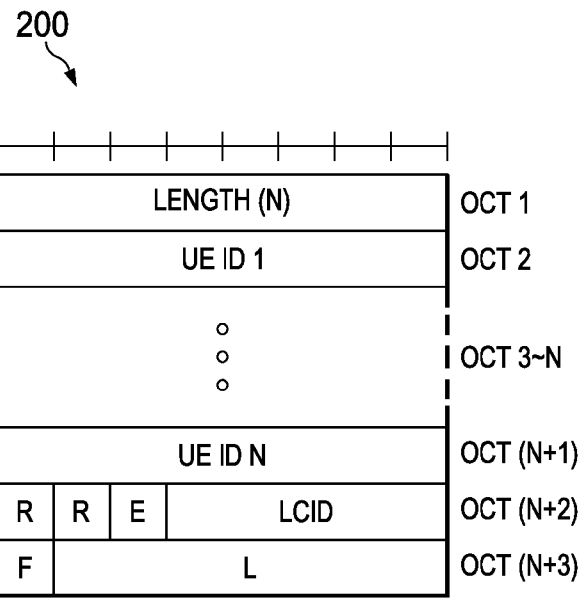
FIGS. 7A-7B illustrate embodiment MAC SDU sub-headers with the number of UEs in a group and a list of UE IDs of UEs in the group.
Figure 7B:
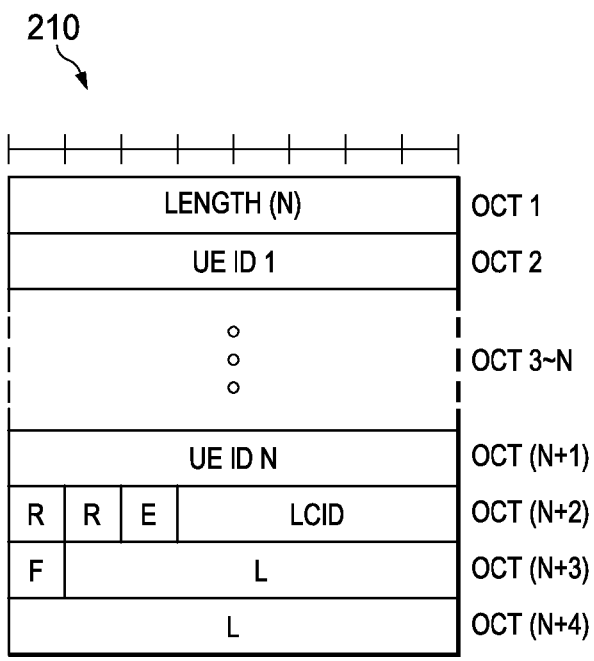

In one example, the number of UEs in the group and a list of UE IDs of UEs in the group are in the MAC sub-header of the MAC SDU. FIGS. 7A-B illustrate an example of a MAC SDU sub-header indicating a list of UE IDs for UEs in a group. FIG. 7A shows MAC SDU sub-header 200, an R/R/E/LCID/F/L sub-header with seven bit L fields, and FIG. 7B shows MAC SDU sub-header 210, an R/R/E/LCID/F/L sub-header with 15 bits L fields. One byte long UE IDs may be used. The receiving UEs may be assigned the same LCID, and the MAC SDU sub-headers illustrated in FIGS. 7A-B are used. Alternatively, the receiving UEs all have different LCIDs for the shared data. In this case, the MAC sub-header may include a list of both the UE IDs and LCID of corresponding UEs. Depending on whether the length of the UE ID is byte aligned, other formats may be used. For example, for a 7 bit UE ID, an extension bit may be added after the UE IDs except the last one, and the length field might not be used. The extension bit may be set to 1 when there is more to the UE ID and set to 0 otherwise. Alternatively, the extension bit is set to 0 when there is more to the UE ID and set to 1 otherwise.

Figure 8A:
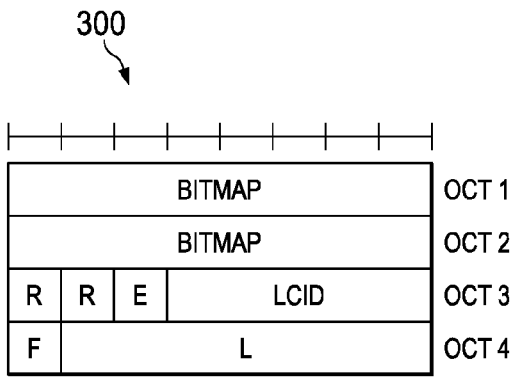
FIGS. 8A-8B illustrate embodiment MAC SDU sub-headers with bitmaps.
Figure 8B:
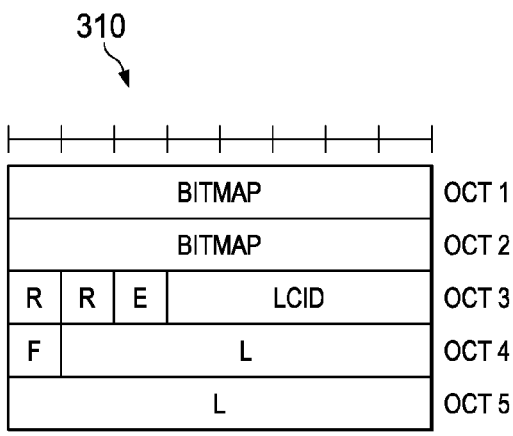

In an additional embodiment, a bitmap is added to the MAC sub-header of the MAC SDU. FIGS. 8A-B illustrate an example of a MAC SDU sub-header with a bitmap indicating the intended receiving UEs. FIG. 8A shows MAC sub-header 300, an R/R/E/LCID/F/L sub-header with a seven bit L field, and FIG. 8B shows MAC SDU sub-header 310, an R/R/E/LCID/F/L sub-header with 15 bits in the L field. The bitmap indicates the intended receiving UEs, by having the bits in the bitmap set to the value 1 or 0 according to whether or not the associated UE is to receive the MAC SDU. The mapping between the bitmap value and the UEs in the group is configured by the network in advance, for example using RRC messages. The receiving UE may be assigned the same LCID for shared data, or different LCIDs for the shared data. When one LCID is uses, one LCID may be in the MAC sub-header. On the other hand, when multiple LCIDs are used, a list of LCIDs for the corresponding UEs may be used, for example in the order of the presence in bitmap.

Figure 9:
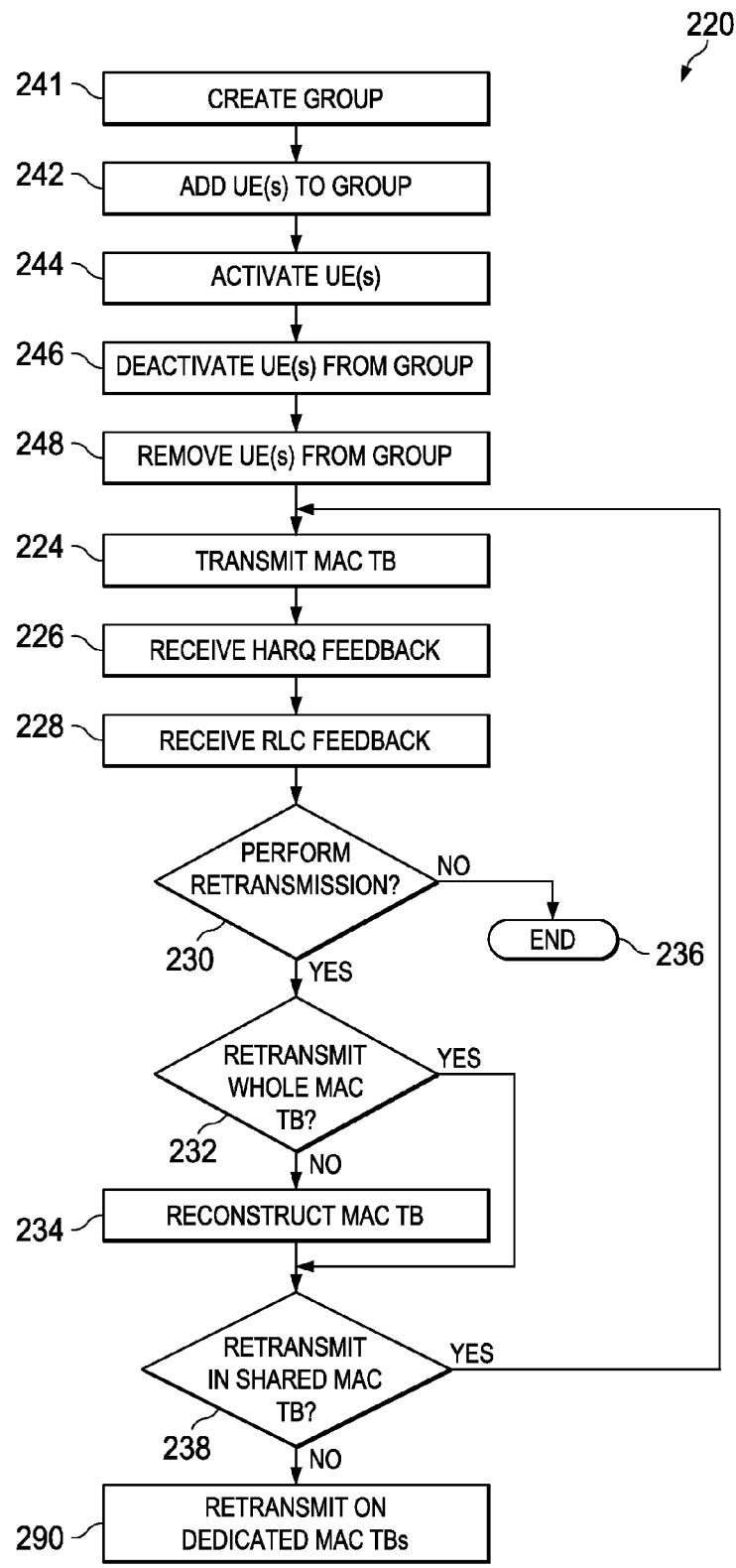
FIG. 9 illustrates a flowchart of an embodiment method of MAC sub-headers for TB sharing performed by a communications controller.

FIG. 9 illustrates flowchart 220 for a method of MAC TB sharing performed by a communications controller. Initially, in step 241, the communications controller decides to create a group. This may occur, for example, when a group call or IM session is beginning. The communications controller may assign a group identifier, such as a G-RNTI, to the group.

Then, in step 242, the communications controller adds one or more UE(s) to the group. This may occur, for example, when a UE joins a group call, an IM session, or another form of group communication. A communications controller may have more than one group. Adding a UE to a group may be performed using RRC messages or MAC CEs. In one example, the communications controller receives a message from a UE requesting to join a group. In response, the communications controller transmits a grant message to the UE. Alternatively, the communications controller transmits a message to a UE requesting that the UE join a group, and the UE responds with an acknowledgement message. The communication controller transmits a G-RNTI, group specific UE IDs, and/or universal UE IDs to the UE(s) joining the group, for example in a grant message or a request message. In one example, the C-RNTI is used as the UE ID to the UE joining the group. When a UE is configured into a group call, it can also be assigned a bit location in a bitmap. A bit value 1 may indicate that there is a MAC SDU in the MAC PDU for the UE. Alternatively, a bit value of 0 indicates that there is a MAC SDU in the MAC PDU for the UE.

In step 244, the communications controller activates a UE which has already been added to the group. When a UE is activated, it begins to listen to PDCCH for specific DCI to retrieve MAC TBs from the PDSCH for the group. Activation may be performed using RRC messaging or MAC CEs. The communications controller may transmit an activate message to a UE, and the UE responds with an acknowledgement. In one example, step 242 and step 244 are combined in one step, and the UE automatically begins the reception process for the group related MAC TBs when added to a group. Alternatively, step 242 and step 244 are performed separately. For example, when a UE starts an IM session, it may be the only UE in that cell. Thus, the network may send the grouping information to a UE in advance, without requesting that the UE start receiving data for the G-RNTI yet. Once there are sufficient UEs in the group, the communications controller may activate the UEs to listen to the PDCCH for DCI related to PDSCH carrying the group MAC TBs.

The communications controller deactivates an activated UE in step 246. The communications controller may send an RRC message or MAC CEs to the UE deactivating the UE. The UE then responds with an acknowledgment. Alternatively, the UE requests to be deactivated, and the communications controller responds by deactivating the UE. A UE may be deactivated, but remain in the group, and may be reactivated. Alternatively, the UE may be deactivated and removed from the group at the same time.

A deactivated UE may be removed from the group in step 248. RRC messages or MAC CEs may be used to remove the UE from the group. In one example, the communications controller sends a message to the UE removing the UE from the group, and the UE responds with an acknowledgment message. Alternatively, the UE requests to be removed from the group, and the communications controller removes the UE from the group.

When a group has been formed, the communications controller transmits MAC TB to the UEs in the group over the shared PDSCH using the same time frequency resources in step 224. The communications controller may decide which UEs are in the group, and select a MAC PDU which is destined for multiple UEs in the group of UEs. Then, the MAC PDU is set to indicate that the MAC PDU is destined for multiple UEs in the group of UEs. The group of UEs may be indicated by a G-RNTI.

The MAC format may indicate that the MAC TB is shared by multiple UEs. In one example, when a MAC TB is received from the shared PDSCH, for example through the G-RNTI, it is considered to be the MAC TB shared by multiple UEs. In another example, a MAC CE indicates that the MAC TB is shared by multiple UEs.

Also, a MAC format may indicate the correspondence between a MAC SDU and a UE. In one example, a C-RNTI or UE ID of the corresponding UE is in the sub-header of the MAC SDU, for example in the front of the sub-header. In another example, the C-RNTI or UE ID of the corresponding UE is added to the beginning of the MAC SDU payload.

Additionally, the MAC format may indicate the correspondence between the MAC SDU and multiple UEs. Multiple UE IDs or C-RNTIs may be added to the sub-header of the MAC SDU to indicate recipients of the MAC SDU. In one example, the number of intended receiving UEs is in the MAC sub-header of the MAC SDU, and a list of C-RNTIs or UE IDs of the corresponding UEs, for example in the front of the sub-header. The receiving UEs may have been assigned the same LCID for shared data, or they may be assigned different LCIDs. In another example, the C-RNTI or UE ID of the corresponding UE is added to the beginning of the MAC SDU payload. In an additional example, a bitmap is added to the MAC sub-header of the MAC SDU, indicating the intended receiving UEs. Alternatively, it is assumed that all activated UEs within a group process the MAC SDUs of the MAC PDU for the specified G-RNTI, and only the MAC SDUs destined for a subset of the activated UE s of the group are indicated.

During the transmission of the MAC TB, the communications controller receives HARQ feedback from the UEs in step 226. The HARQ feedback may be an ACK or NACK. The communications controller may receive HARQ feedback from all, some, or none of the UEs.

Next, in step 228, the communications controller receives RLC feedback from the UEs in the group. The RLC feedback is an ACK or NACK. RLC feedback may be received from some, all, or none of the UEs in the group.

Then, in step 230, the communications controller decides whether to perform a retransmission. A retransmission may be performed when the communications controller receives a HARQ NACK and/or an RLC NACK from a UE in the group. When the communication controller decides not to perform a retransmission, it proceeds to step 236 and ends the method. When the communications controller decides to perform a retransmission, it proceeds to step 232.

In step 232, the communications controller decides whether to retransmit the whole MAC TB or construct a new MAC TB. In one embodiment, the communications controller always retransmits the whole MAC TB. When the communications controller decides to retransmit the whole MAC TB, it proceeds to step 238. However, when the communications controller decides not to retransmit the whole MAC TB, it proceeds to step 234.

In step 234, the communications controller reconstructs the MAC TB. For example, the communications controller may construct a MAC TB with only the data for UEs with HARQ NACKs and/or RLC NACKs. Then, the communications controller proceeds to step 238.

In step 238, the communications controller decides whether to retransmit the MAC TB in a shared MAC TB or a dedicated MAC TB. For example, if the retransmission is for only one UE, or to a few UEs, it may be transmitted on dedicated MAC TB(s). When the retransmission is to many UEs, or to all of the UEs in the group, it may be in the shared MAC TB. In one example, the communication controller always retransmits in a shared MAC TB. In another example, the communications controller always retransmits in dedicated MAC TBs. When the communications controller decides to retransmit in dedicated MAC TBs, it proceeds to step 290, and when it decides to retransmit in a shared MAC TB, it proceeds to step 224.

In step 290, the communications controller retransmits a UE's MAC TB in dedicated MAC TBs. In one example, the communications controller retransmits only to UEs which have sent a HARQ NACK and/or a RLC NACK.

Figure 10:
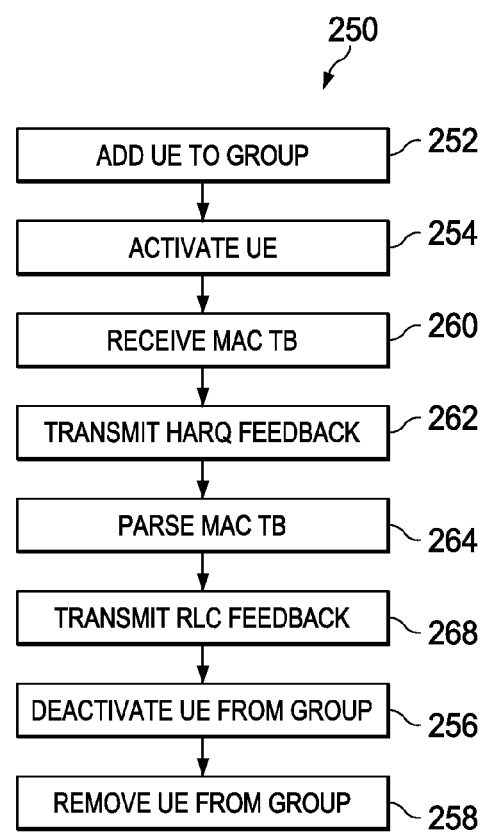
FIG. 10 illustrates a flowchart of an embodiment method of MAC sub-headers for TB sharing performed by a UE.

FIG. 10 illustrates flowchart 250 for a method of MAC TB sharing performed by a UE. Initially, in step 252, the UE is added to a group. This may be done using RRC messaging and/or MAC CEs. The UE may request to join a group by transmitting a message to the communications controller, and the UE receives a grant message from the communications controller. Alternatively, the UE receives a message from the communications controller adding the UE to the group, and the UE responds with an acknowledgement message.

Then, in step 254, the UE is activated. Activation may be performed using RRC messaging and/or MAC CEs. In one example, the UE requests to be activated by sending a message to the communications controller, and the communications controller responds with a grant message. Alternatively, the UE receives a message from the communications controller activating the UE, and the UE responds with an acknowledgement message. The UE may receive a G-RNTI, and/or UE IDs. When the UE is activated, it listens to the PDCCH for DCI with information (such as G-RNTI) pointing to the reception of MAC TBs from the PDSCH. In one example, adding and activating the UE constitute a single step. Alternatively, the UE is added and later activated.

After the UE is activated, it receives a MAC TB from the communications controller in step 260. The UE receives the MAC TB over the shared PDSCH using the same frequency resources.

In response to the MAC TB received in step 260, the UE transmits HARQ feedback in step 262. For example, the UE transmits an ACK to the communications controller when the UE successfully receives the MAC TB, and the UE transmits a NACK to the communications controller when the UE does not successfully receive the MAC TB. In one example, the UE provides HARQ feedback when it receives a message for itself. Alternatively, HARQ feedback is disabled.

Next, in step 264, the UE parses the MAC TB to determine whether there is any data for itself. The MAC format may indicate that the MAC TB is shared by multiple UEs. In one example, when a MAC TB is received from the shared PDSCH, for example through the G-RNTI, it is considered to be the MAC TB shared by multiple UEs. In another example, a MAC CE indicates that the MAC TB is shared by multiple UEs.

A MAC format may indicate the correspondence between a MAC SDU and a UE. In one example, a C-RNTI or UE ID of the corresponding UE is in the sub-header of the MAC SDU, for example in the front of the sub-header. In another example, the C-RNTI or UE ID of the corresponding UE is added to the beginning of the MAC SDU payload.

The MAC format may indicate the correspondence between the MAC SDU and multiple UEs. Multiple UE IDs or C-RNTIs may be added to the sub-header of the MAC SDU to indicate recipients of the MAC SDU. In one example, the number of intended receiving UEs is in the MAC sub-header of the MAC SDU, and a list of C-RNTIs or UE IDs of the corresponding UEs, for example in the front of the sub-header. The receiving UEs may have been assigned the same LCID for shared data, or they may be assigned different LCIDs. In another example, the C-RNTI or UE ID of the corresponding UE is added to the beginning of the MAC SDU payload. In an additional example, a bitmap is added to the MAC sub-header of the MAC SDU, indicating the intended receiving UEs. Alternatively, it is assumed that all activated UEs within a group process the MAC SDUs of the MAC PDU for the specified G-RNTI, and only the MAC SDUs destined for a subset of the activated UEs of the group are indicated.

When the UE decides that there is information for itself, it extracts the information.

Then, in step 268, the UE transmits RLC feedback (ACK or NACK) to the communications controller. The UE may skip step 268 when in UM mode. The UE may be configured to send RLC STATUS PDU when the downlink data is transferred in AM mode. The UE may transmit RLC feedback periodically without explicit polling. Alternatively, the UE is polled for RLC feedback.

In step 256, the UE is deactivated. Deactivation may be performed using RRC messages or MAC CEs. In one example, the UE sends a message to the communications controller asking to be deactivated, and the communications controller responds with a message. Alternatively, the UE receives a message from the communications controller initiating the deactivation, and the UE responds with an acknowledgement. When the UE is deactivated, it stops the reception of MAC TBs form the PDSCH when PDCCH carries information related to the group call. The deactivated UE may be reactivated or removed.

In step 258, the deactivated UE is removed from the group. The UE removal may be performed using RRC messaging or MAC CEs. In one example, the UE transmits a message to the communications controller initiating the removal, and the communications controller sends a response message. Alternatively, the UE receives a message from the communications controller initiating the removal, and the UE sends an acknowledgment message to the communications controller. In one example, the UE is deactivated and removed in a single step. Alternatively, the UE is first deactivated, and later removed. The UE may be activated again, instead of being removed.

Figure 11:
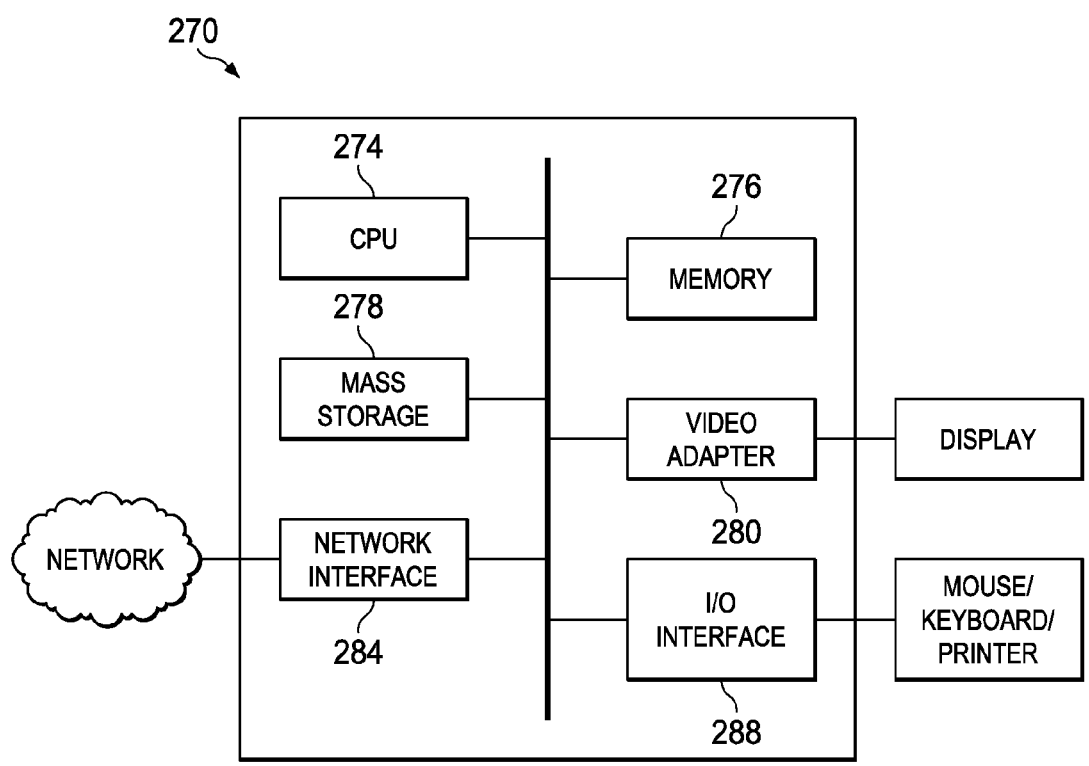
FIG. 11 illustrates a block diagram of an embodiment general-purpose computer system.

FIG. 11 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of non-transitory storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for transmitting a first media access control (MAC) protocol data unit (PDU), the method comprising:
   determining multiple user equipments (UEs) in a group of UEs;
   determining that the first MAC PDU is destined for the multiple UEs in the group of UEs;
   setting the first MAC PDU to indicate that the first MAC PDU comprises a plurality of MAC service data units (SDUs) destined for the multiple UEs in the group of UEs and an element comprising a list of UE identifiers (UE IDs) for the multiple UEs; and
   transmitting, by a communications controller to the multiple UEs, the first MAC PDU;
   receiving, by the communications controller from a first UE, a radio link control (RLC) response; and
   determining whether to perform a retransmission of a selected MAC SDU of the plurality of MAC SDUs in accordance with the RLC response.

2. The method of claim 1, further comprising:
   receiving, by the communications controller from a second UE of the group of UEs, a hybrid automatic repeat request (HARQ) response; and
   determining whether to perform a retransmission of a selected MAC SDU of the plurality of MAC SDUs in accordance with the HARQ response.

3. The method of claim 2, further comprising determining whether to retransmit the first MAC PDU or to produce a second MAC PDU for the selected MAC SDU.

4. The method of claim 1, wherein the first MAC PDU comprises a MAC control element (CE), and wherein the MAC CE indicates that the first MAC PDU is shared.

5. The method of claim 1, wherein the first MAC PDU indicates the multiple UEs of the group of UEs.

6. The method of claim 5, wherein the first MAC PDU comprises a plurality of cell radio network temporary identities (C-RNTIs) for the multiple UEs of the group of UEs.

7. The method of claim 5, wherein the first MAC PDU comprises a plurality of UE identification numbers (IDs) for the multiple UEs of the group of UEs.

8. The method of claim 5, wherein a MAC sub-header of the first MAC PDU indicates the multiple UEs of the group of UEs.

9. The method of claim 8, wherein the MAC sub-header comprises a bitmap, and wherein the bitmap indicates the multiple UEs of the group of UEs.

10. The method of claim 5, wherein a MAC payload of the first MAC PDU indicates the multiple UEs of the group of UEs.

11. The method of claim 5, wherein the first MAC PDU further comprises a number of the multiple UEs in the group of UEs.

12. The method of claim 5, wherein the first MAC PDU further comprises a list of logical channel identifiers (LC-IDs).

13. The method of claim 1, further comprising:
   deciding to create the group of UEs;
   assigning a group identifier to the group of UEs;
   adding a second UE to the group of UEs, comprising transmitting the group identifier to the second UE;
   determining whether to activate the second UE; and
   activating the second UE after adding the second UE in response to determining to activate the second UE.

14. The method of claim 1, further comprising:
   deactivating a second UE of the group of UEs;
   determining whether to remove the second UE from the group of UEs; and
   removing the second UE from the group of UEs after determining to remove the second UE.

15. A communications controller comprising:
   a processor; and
   a non-transitory computer readable storage medium storing programming for execution by the processor, the programming including instructions to:
   determine multiple user equipments (UEs) in a group of UEs,
   determine that a first MAC PDU is destined for the multiple UEs in the group of UEs,
   set the first MAC PDU to indicate that the first MAC PDU comprises a plurality of MAC service data units (SDUs) destined for the multiple UEs in the group of UEs and an element comprising a list of UE identifiers (UE IDs) for the multiple UEs, and
   transmit, to the multiple UEs, the first MAC PDU;
   receive, from a first UE, a radio link control (RLC) response; and
   determine whether to perform a retransmission of a selected MAC SDU of the plurality of MAC SDUs in accordance with the RLC response.

16. The communications controller of claim 15, wherein the programming further includes instructions to:
   receive, by the communications controller from a second UE of the group of UEs, a hybrid automatic repeat request (HARQ) response; and
   determine whether to perform a retransmission of a selected MAC SDU of the plurality of MAC SDUs in accordance with the HARQ response.

17. The communications controller of claim 16, wherein the programming further includes instructions to determine whether to retransmit the first MAC PDU or to produce a second MAC PDU for the selected MAC SDU.

18. The communications controller of claim 15, wherein the first MAC PDU comprises a MAC control element (CE), and wherein the MAC CE indicates that the first MAC PDU is shared.

19. The communications controller of claim 15, wherein the first MAC PDU indicates the multiple UEs of the group of UEs.

20. The communications controller of claim 19, wherein the first MAC PDU comprises a plurality of cell radio network temporary identities (C-RNTIs) for the multiple UEs of the group of UEs.

21. The communications controller of claim 19, wherein the first MAC PDU comprises a plurality of UE identification numbers (IDs) for the multiple UEs of the group of UEs.

22. The communications controller of claim 19, wherein a MAC sub-header of the first MAC PDU indicates the multiple UEs of the group of UEs.

23. The communications controller of claim 22, wherein the MAC sub-header comprises a bitmap, and wherein the bitmap indicates the multiple UEs of the group of UEs.

24. The communications controller of claim 19, wherein a MAC payload of the first MAC PDU indicates the multiple UEs of the group of UEs.

25. The communications controller of claim 19, wherein the first MAC PDU further comprises a number of the multiple UEs in the group of UEs.

26. The communications controller of claim 19, wherein the first MAC PDU further comprises a list of logical channel identifiers (LCIDs).

27. The communications controller of claim 15, wherein the programming further includes instructions to:
   decide to create the group of UEs;
   assign a group identifier to the group of UEs;
   add a second UE to the group of UEs, comprising transmitting the group identifier to the second UE;
   determine whether to activate the second UE; and
   activate the second UE after adding the second UE in response to determining to activate the second UE.

28. The communications controller of claim 15, wherein the programming further includes instructions to:
   deactivate a second UE of the group of UEs;
   determine whether to remove the second UE from the group of UEs; and
   remove the second UE from the group of UEs after determining to remove the second UE.

* * * * *